United States Patent
Manchester et al.

(10) Patent No.: US 8,910,220 B2
(45) Date of Patent: Dec. 9, 2014

(54) MULTI-FORMAT DISTRIBUTION OF CONTENT

(75) Inventors: James S. Manchester, New York, NY (US); Michael Angus, New York, NY (US); Wilfred Jaime Miles, Arvada, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 53 days.

(21) Appl. No.: 13/548,102

(22) Filed: Jul. 12, 2012

(65) Prior Publication Data

US 2014/0020034 A1    Jan. 16, 2014

(51) Int. Cl.
*H04N 7/173*    (2011.01)

(52) U.S. Cl.
USPC .................................. 725/93; 725/90; 725/95

(58) Field of Classification Search
None
See application file for complete search history.

(56) References Cited

U.S. PATENT DOCUMENTS

| | | | |
|---|---|---|---|
| 2007/0130626 A1 | 6/2007 | Kato et al. | |
| 2008/0229375 A1* | 9/2008 | Roberts et al. | 725/100 |
| 2008/0235351 A1 | 9/2008 | Banga et al. | |
| 2009/0113481 A1* | 4/2009 | Friedman | 725/46 |
| 2010/0146567 A1* | 6/2010 | Mehta et al. | 725/91 |
| 2011/0173304 A1* | 7/2011 | Schlack et al. | 709/220 |
| 2012/0079523 A1* | 3/2012 | Trimper et al. | 725/28 |
| 2012/0079606 A1 | 3/2012 | Evans et al. | |
| 2012/0124172 A1 | 5/2012 | Sparks | |
| 2012/0166668 A1 | 6/2012 | Mathews et al. | |
| 2013/0125185 A1* | 5/2013 | Jana et al. | 725/109 |

* cited by examiner

*Primary Examiner* — Chris Parry
(74) *Attorney, Agent, or Firm* — Chapin IP Law, LLC

(57) ABSTRACT

A content delivery resource in a cable network receives a request for specified content. The content delivery resource retrieves profile information assigned to the subscriber domain. The profile information indicates multiple different playback formats assigned to the subscriber domain. To service the request, the content delivery resource utilizes the profile information associated with the subscriber domain to select versions of the specified content encoded in accordance with the multiple different playback formats. The content delivery resource then initiates transmission of the versions of the specified content in the multiple different playback formats to the subscriber domain for playback on multiple types of playback devices.

21 Claims, 10 Drawing Sheets

MULTI-FORMAT DISTRIBUTION OF CONTENT

BACKGROUND

Conventional large cable networks include distributed video and data facilities to deliver content in a cable network environment. For example, in a typical cable network, content such as videos are distributed over a backbone or core network to so-called headend resources that service one or more hubs in a region. The hubs receive and re-distribute the content to one or more distribution nodes that each, in turn, conveys the content to a service group including multiple subscribers. The subscribers in a respective service group are able to tune to certain frequencies of the shared cable using a set-top box, cable modem, etc., to retrieve and play back desired content.

As a more specific example of distinguishing content in a cable network, a subscriber can generate a request to retrieve content encoded in accordance with a specified format. For example, the subscriber may request content to be retrieved in a specified format for playback on a big screen television. A server transmits the requested content in the specified format (as indicated in the request) to the subscriber's digital video recorder. The subscriber can then play back the retrieved content on a playback device that supports playback in the specified format.

In certain instances, a subscriber may operate multiple different types of playback devices. For example, a subscriber may own an iPad™ that plays back content encoded in a first format; the subscriber can own a big screen television that plays back content according to a second format; and so on.

In accordance with the above example, the subscriber may request the content for playback on a first type of playback device and then later change his mind and desire to playback the content on a second playback device. Conventional applications can include providing a subscriber the ability to transcode the transmitted format. For example, a set-top box in the home environment that stores the requested content can include a so-called transcoder. The subscriber can use the transcoder to convert the retrieved content received in the single format into any suitable encoded format. Thus, via appropriate transcoding by the subscriber, the subscriber can convert and thereafter playback content on any type of playback device.

BRIEF DESCRIPTION OF EMBODIMENTS

Conventional transcoding of content at a subscriber site is undesirable for multiple reasons.

For example, transcoding can be costly. To transcode in a subscriber's home network environment, each set-top box or other suitable resource in the home environment must be configured to include hardware and/or software resources to transcode the retrieved content from one format to another. This increases the amount of electronics that must be included in each set-top box.

Transcoding can be inconvenient. Typically, the subscriber must manually execute the transcoder in the home network environment to convert the content into an appropriate format for playback on a desired target playback device. In certain cases, the subscriber may not have appropriate technical expertise to provide appropriate input to carry out transcoding of content from one format to another. In other words, the input needed to initiate transcoding and storing of the content can be rather complex.

Transcoding can be slow and cause delays. Retrieved content may include many bits of information. Conversion from one format to another may require a substantial amount of time, delaying when a subscriber is able to download and then subsequently playback the content.

Embodiments herein deviate with respect to conventional techniques. For example, one embodiment herein is directed to distributing content encoded in multiple formats in response to receiving a request for content.

More specifically, in accordance with one embodiment, a content delivery resource in a network receives a request to transmit specified content to a subscriber domain. In one embodiment, the content delivery resource retrieves or obtains profile information assigned to the subscriber domain. The profile information indicates multiple different playback formats assigned to the subscriber domain for use by multiple playback devices.

Based on the profile information, in lieu of selecting only a single format of requested content, the content delivery resource selects multiple formats of the specified content and transmits the requested content in multiple different playback formats to the subscriber domain for playback.

The content delivery resource can be configured to transmit the multiple-formatted content over any suitable network such as one or more broadcast channels in a cable television network. In accordance with one embodiment, the different content is transmitted over one or more different channels (e.g., broadcast channels, IP channels, etc.) of the same type.

In accordance with further embodiments, the content delivery resource can be configured to transmit the different formatted content over different types of channels in a shared cable network environment. For example, in one embodiment, the content delivery resource can be configured to transmit the requested content in a first format over a television broadcast channel; the content delivery resource transmits a second format of the requested content over an IP channel.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate distribution of content according to one or more different formats from a server. The instructions, when executed by a processor of a respective computer device, cause the processor or multiple processors of the system to: receive a request to transmit specified content to a subscriber domain; receive profile information of the subscriber domain, the profile information indicating multiple different playback formats assigned to the subscriber domain; utilize the profile information of the subscriber to identify versions of the specified content encoded in accordance with the multiple different playback formats; and initiate transmission of the versions of the specified content in the multiple different playback formats to the subscriber domain.

Yet another embodiments herein includes a computer readable storage medium and/or system having instructions stored thereon to facilitate retrieval of content in accordance with one or more different formats. The instructions, when executed by a processor of a respective computer device, cause the processor or multiple processors of the system to: input profile information indicating multiple different types of playback devices as being used to playback content in a subscriber domain; transmit a request for retrieval of specified content over a network to a content delivery resource that identifies multiple versions of the specified content to deliver to the subscriber domain based on the profile information; and receive multiple formatted versions of the specified content from the content delivery resource for playback on the multiple different types of playback devices.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing different levels of quality of adaptive bit rate encoded content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure. Instead, this brief description only presents general embodiments and corresponding points of novelty over conventional techniques. For additional details and/or possible perspectives (permutations) of the disclosure, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a content delivery resource in a cable network receives a request for specified content. The content delivery resource retrieves profile information assigned to the subscriber domain. The profile information indicates multiple different playback formats assigned to the subscriber domain. To service the request, the content delivery resource utilizes the profile information of the subscriber to identify select versions of the specified content encoded in accordance with the multiple different playback formats. The content delivery resource then initiates transmission of the selected versions of the specified content in the multiple different playback formats to the subscriber domain for playback of the specified content on multiple types of playback devices.

Figure 1:
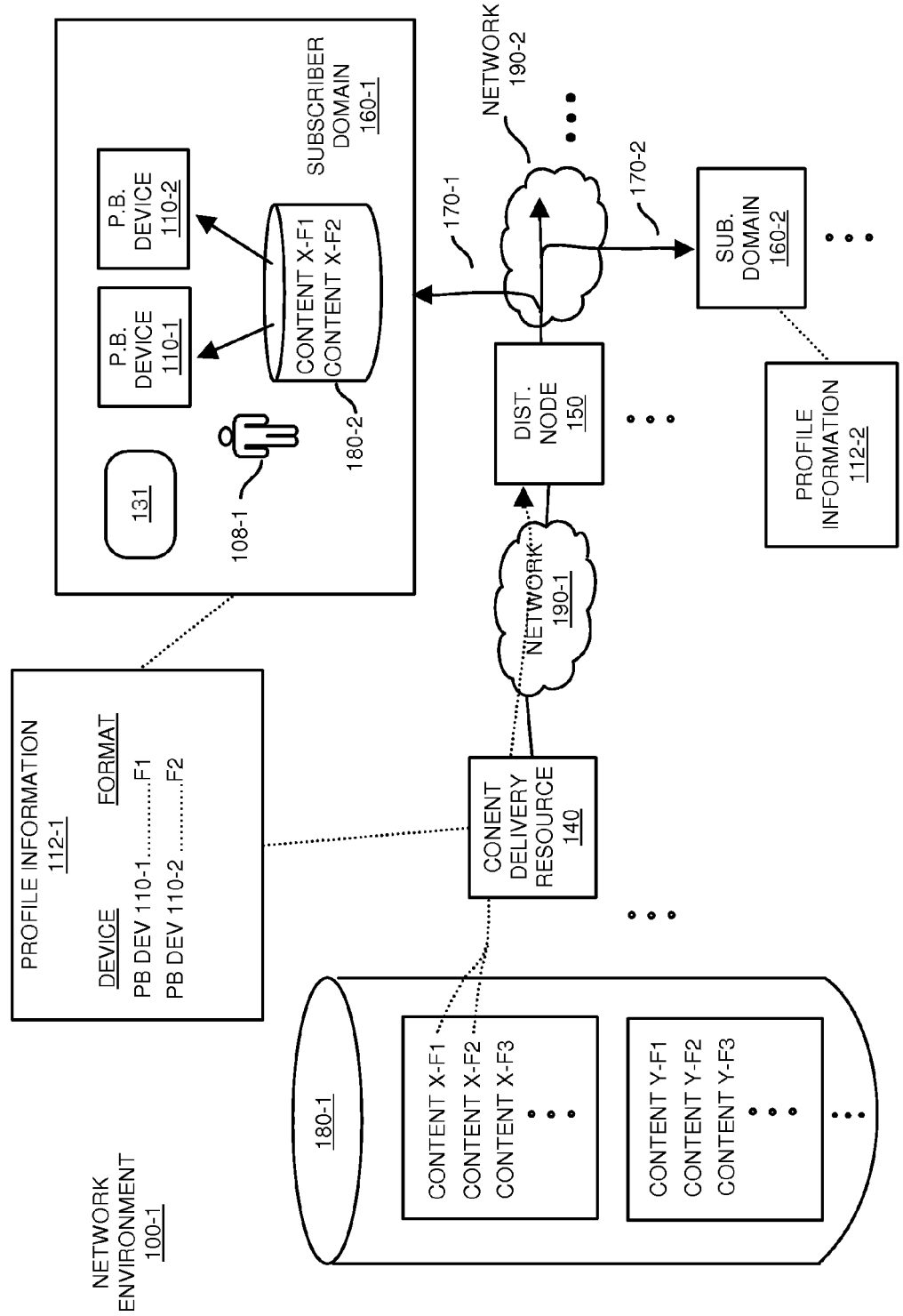
FIG. 1 is an example diagram illustrating a network environment facilitating distribution of content in different encoding formats according to embodiments herein.

More specifically, FIG. 1 is an example diagram of a network environment facilitating novel distribution of content encoded in different formats according to embodiments herein.

As shown, network environment 100-1 includes content delivery resource 140, network 190-1, distribution node 150, network 190-2, and multiple different subscriber domains 160 (e.g., subscriber domain 160-1, subscriber domain 160-2, etc.).

By way of a non-limiting example, the network environment 100-1 can be a cable television network environment in which the distribution node 150 transmits content to subscribers in a respective service group. For example, the content delivery resource 140 may be a server configured to communicate over network 190-1 with distribution node 150. Distribution node initiates transmission of received data over a shared communication link 170 (e.g., communication link 170-1, communication link 170-2, etc.) in network 190-2 to one or more respective subscribers.

In yet further embodiments, note that the content encoded according to different formats can be transmitted over of one or more suitable channels. For example, the content in different formats can be transmitted over one or more broadcast channels, QAM channels, DOCSIS channels, non-DOCSIS channels, etc.

As will be discussed later in this specification, by way of a non-limiting example, a first portion of the bandwidth such as one or more QAM channels, broadcast channels, etc., of the communication link 170 can be allocated for transmission of broadcast type data (e.g., QAM data, etc.) to respective subscribers in a service group. In one embodiment, the first portion of the bandwidth can be one or more legacy QAM video channels or non-DOCSIS type channels. A second portion of the bandwidth of the communication link 170 can be allocated for transmission of IP (Internet Protocol) type data packets over, for example, one or more DOCSIS type channels. By further way of a non-limiting example, each of the subscriber domains 160 (e.g., subscriber domain 160-1, subscriber domain 160-2, . . . ) can represent a region controlled by a respective subscriber such as a home environment, business environment, etc., under control of the subscriber to receive communications transmitted over the network 190-2.

Note that each respective subscriber domain 160 may extend beyond a particular region such as a home environment. For example, a user may operate a respective playback device (that is sometimes used in the home) in a publicly accessible WiFi network external to the home environment. In such an instance, the subscriber domain extends to the playback device operated by the user outside of the immediate home environment.

As mentioned, the distribution node 150 distributes content to subscribers in network 190-2. In one embodiment, in a reverse direction, note that each subscriber domain 160 can communicate in a reverse direction over network 190-2 to the content delivery resource 140. Accordingly, the communication link 170 in network 190-2 can support two-way data traffic.

Each subscriber domain 160 (e.g., subscriber domain 160-1, subscriber domain, 160-2, etc.) coupled to network 190-2 can include one or more types of playback devices. For example, subscriber domain 160-1 can include playback device 110-1, playback device 110-2, etc.). One or more different users in a respective subscriber domain 160-1 can operate the respective playback devices 110.

Playback devices 110 can be any type communication or processing device such as personal computers, mobile computer devices, televisions, set-top boxes, mobile devices, personal digital assistants, touch pad devices, portable computers, wire-line telephones, cable set-top boxes, televisions, display screens, wireless phones, wireless mobile device, Apple™ devices, etc.

Each playback device in a respective subscriber domain can be configured to require that content be formatted in accordance with a specific formatted suited for playback by the playback device. For example, playback device 110-1 may require that content be encoded in accordance with a first format; playback device 110-2 may require that content be encoded in accordance with a second format; and so on.

In accordance with further embodiments, the content delivery resource 140 has access to profile information associated with each subscriber domain. For example, profile information 112-1 in this example stores data indicating attributes of playback devices in subscriber domain 160-1; profile information 112-2 stores data indicating attributes of playback devices in subscriber domain 160-2; and so on.

The profile information indicates attributes and/or different parameters (e.g., required format, display screen resolution, bit rate, . . . ) of the playback devices used in a respective subscriber domain to play back respective content.

In this example, the profile information 112-1 indicates that playback device 110-1 supports playback of requested content according to a first format F1; the profile information 112-1 further indicates that playback device 110-2 supports playback of content according to a second format F2.

By way of further non-limiting example, content can be formatted in accordance with different formats including HLS (i.e., HTTP Live Streaming), Microsoft™ Smooth Streaming, MPEG 2, MPEG 4, etc. This list in not meant to be exhaustive as the content can be encoded in accordance with any suitable format.

Each subscriber can be assigned use of a respective login account to manage his or her respective network services associated with network 190-2. For example, in one embodiment, via a respective account, through an interface 131 such as web page, the subscriber is able to provide information about playback devices operated in a respective subscriber domain. Thus, in one embodiment, the profile information 112-1 can be populated for a subscriber based on input from the respective subscriber. Alternatively, note that the content delivery resource 140 or other suitable resource can be configured to communicate with the playback devices to determine attributes of the playback devices and store such information in the profile information associated with the subscriber using the playback devices.

Thus, to some extent, the profile information 112 can be a type registration information and/or configuration information retrieved in one or more different ways.

The profile information 112 for each respective subscriber domain 160 can be stored in any suitable location in network environment 100-1. For example, the profile information for a respective subscriber domain 160 can be stored in a repository that is accessible to the content delivery resource 140.

Assume in this example that the user in subscriber domain 160-1 generates a request to retrieve specified content such as content X based on input to graphical user interface 131. In such an instance, the graphical user interface 131 (and related resources) transmits the request for retrieval of content X to the content delivery resource 140 over communication link 170-1.

In response to receiving the request for content X (i.e., specified content), the content delivery resource 140 retrieves profile information 112-1 assigned to the subscriber domain 160-1 from which the request was generated. The request can include information indicating which subscriber or resource in network 190-2 generated the request. As mentioned, and as discussed further herein, the content delivery resource 140 can use the profile information 112-1 to identify the multiple formats of the requested content to be transmitted to the subscriber domain 160-1.

In one embodiment, prior to initiating transmission of any versions of the specified content to the subscriber domain, the content delivery resource 140 can provide a notification to the user that the specified content can be transmitted to the subscriber domain 160-1 in multiple playback formats as specified by the profile information 112-1. In other words, the user may request retrieval of the requested content for subsequent playback on the first playback device 110-1. The notification to the user can include a query such as "Would you like the specified content also to be transmitted in a format for playback device 110-2 as well?"

As a response to the query, the user can indicate YES such that the content delivery resource 140 transmits the specified content in multiple different playback formats to the subscriber domain 160-1 so that the content can be played back on any of the playback devices 110.

Alternatively, if the user answers "NO" to the query, the content delivery resource 140 would potentially transmit the specified content in a single format for playback of the specified content on playback device 110-1.

Assume the user requests the content in multiple formats such as by answering 'YES' as discussed above to have the content transmitted in multiple formats. In such an instance, the content delivery resource 140 utilizes the profile information 112-1 of the subscriber domain 112-1 to identify versions of the specified content (i.e., content X) encoded in accordance with the multiple different playback formats.

In this example embodiment, the content delivery resource 112-1 processes the profile information 112-1 based on receiving the request from user 108-1 in subscriber domain 160-1. Based on the profile information 112-1, the content delivery resource 140 identifies that the playback devices 110-1 and 110-2 in subscriber domain 160-1 support playback in encoding formats F1 and F2.

Via mapping, the content delivery resource 140 selects content X-F1 (e.g., content X formatted in a first format, F1) and content X-F2 (e.g., content X formatted in a second format, F2) from repository 180-1 and then initiates transmission of these versions of the specified content X in the multiple different playback formats (e.g., F1 and F2) to the subscriber domain 160-1 for playback on multiple types of playback devices 110.

As mentioned, network 190-2 can be a cable broadcast type network. In such an instance, the content delivery resource 140 transmits the content X in the multiple formats over network 190-1 to distribution node 150. Distribution node 150, in turn, broadcasts the multi-formatted content (i.e., content X-F1 and content X-F2) over network 190-2 to the multiple subscriber domains 160 in a service group (e.g., subscriber domain 160-1, subscriber domain 160-2, etc.).

Each subscriber domain can include resources to tune to different portions of the signal transmitted on communication link 170 to retrieve the requested content transmitted in multiple encoding formats.

In this example, the repository 180-2 in subscriber domain 160-1 stores the multi-formatted content received over communication link 170-1. Other subscriber domains in network 190-2 may not tune and store the broadcasted content transmitted on the shared communication link because they may have not requested such content.

Subsequent to storage of all or a portion of the content X-F1 and content X-F2 in repository 180-2, the user 108-1 in subscriber domain 160-1 can playback the respective content using playback devices 110.

For example, the playback device 110-1 may be a big screen television supporting hi-definition signals (e.g., format F1). The user 108-1 can initiates playback of the content X in format F1 on the playback device 110-1.

The playback device 110-2 may be an iPad™ device supporting playback of content in format #2. The user 108-1 can download the content X-F2 from repository 180-2 onto playback device 110-2 over a suitable wire or wireless connection. Thereafter, the user 108-1 can initiate playback of the content X in format #2 on the playback device 110-1.

Note that the content in repository 180-2 can be configured to transmit the content to a respective playback device in a multiple ways. For example, the content can be transmitted as a file transfer from the repository 180-2 (such as part of a set-top box) to a playback device for storage and playback at a later time in accordance with input from the user 108-1. The files in the different formats transmitted to the different playback devices can be copies of the content stored in repository 180-2.

In alternative embodiments, the content can be transmitted and immediately consumed by a respective playback device as opposed to be including stored locally in the playback device.

In accordance with yet further embodiments, a respective user can configure a processing resource in the home network (such as a set-top box) to detect when a respective device (e.g., playback device 110-1, playback device 110-2, or other network device) is in communication with the home network in subscriber domain 160-1. The content stored in repository 180-2 can be recorded when a respective playback device resides outside of the subscriber domain 160-1. Upon detecting presence of the playback device in the subscriber domain 160-1, the content can be automatically downloaded to the playback device. Thus, one can bring a playback device home at night. Copies of recorded programs stored in the repository 180-2 can be automatically downloaded to the playback device overnight so that the user 108 can playback such content at a later time as desired.

Figure 2:
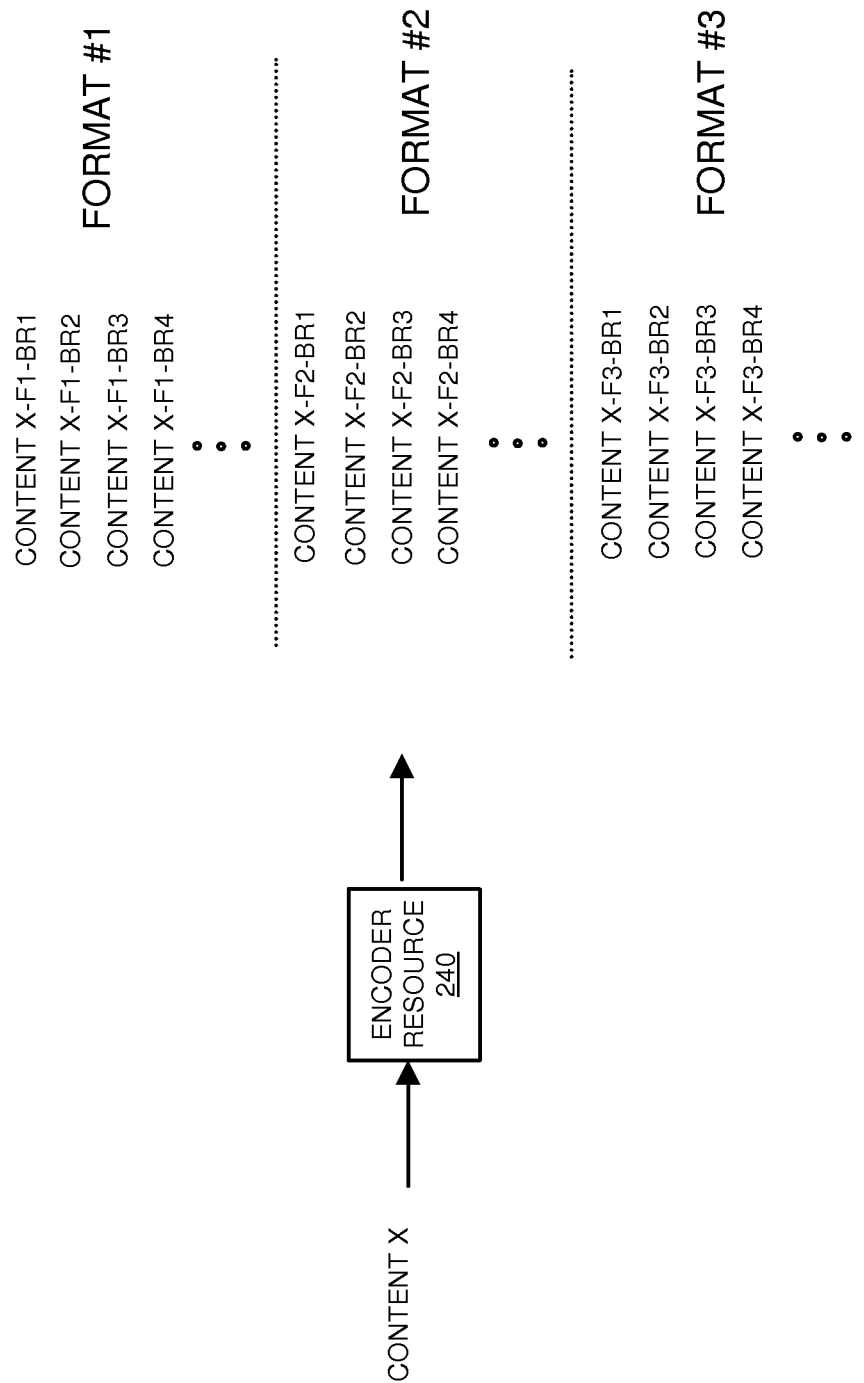
FIG. 2 is an example diagram illustrating transcoding of content into multiple different levels of quality for each of multiple formats according to embodiments herein.

FIG. 2 is an example diagram illustrating conversion of content X into multiple different formats according to embodiments herein.

As shown, the encoder resource 240 processes content X such as a movie, news video, documentary, television program, etc. The encoder resource 240 converts the original content X (e.g., as received in a format such as an MPEG format) into different formats such as format #1, format #2, format #3, etc.

In one embodiment, for each of the format types #1, #2, #3, etc., the encoder resource 240 can be configured to encode the content at different playback bit rates (e.g., levels of quality). For example, encoder resource 240 can encode content X in the first format F1 at multiple different bit rates BR1, BR2, BR3, BR4, etc.; encoder resource 240 can encode content X in the second format F2 at multiple different bit rates BR1, BR2, BR3, BR4, etc.; and so on.

As would be expected, higher playback bit rates (e.g., content X in format #1 at bit rate BR1) support playback at a higher level of quality and requires more bandwidth to transmit to a remote destination; lower playback bit rates (e.g., content X in format #1 at bit rate BR10) support playback at a lower level of quality and require less bandwidth to transmit to a remote destination.

Additional details of converting content into different bit rate data streams can be found in related U.S. patent application Ser. No. 13/441,355 entitled "Variability in Available Levels of Quality of Encoded Data," filed on Apr. 6, 2012, the entire teachings of which are incorporated herein by this reference.

Referring again to FIG. 1, note that embodiments herein can include transmitting the encoded content X at a bit rate suitable for a respective playback device expected to playback the content. For example, the profile information 112-1 for a respective subscriber domain 160-1 can indicate that the playback device 110-1 has the ability to playback the content X at the highest level of quality (i.e., BR1) in format FIG. 1 based on a parameter such as a resolution of the display screen, image processing capability, etc., of the playback device 110-2. In such an instance, assuming appropriate bandwidth is available to convey the content X in format #1 at the highest bit rate BR1, the content delivery resource 140 transmits content X-F1-BR1 (e.g., content X in format #1 at bit rate #1) to the repository 180-2 in subscriber domain 160-1.

Additionally, the profile information 112-1 for respective subscriber domain 160-1 can indicate that the playback device 110-2 has the ability to playback the content X at a middle level of quality (i.e., BR4) based on parameters such as a resolution of the display screen, image processing capability, etc., of the playback device 110-2. Transmitting the content X in format #2 at the highest level of quality may not be useful because the user viewing playback device 110-2 would not be able to discern that the higher level of quality affords a better viewing experience. In such an instance, assuming appropriate bandwidth is available to convey the content X in format #2 at the middle bit rate BR4, the content delivery resource 140 transmits content X-F2-BR4 (e.g., content X in format #2 at bit rate #4) to the repository 180-2 in subscriber domain 160-1.

Thus, embodiments herein can include, responsive to receiving a request for specified content X, the content delivery resource 140 streams a first version of the specified content X and a second version of the specified content X to the subscriber domain 160-1. The content delivery resource 140 can be configured to transmit the first version of the specified content X in accordance with a first playback bit rate such as bit rate BR1; the content delivery resource 140 can be configured to transmit the second version of the specified content X in accordance with a second playback bit rate such as bit rate BR4.

In further embodiments, when transmitting the content X encoded in the different formats or at the different levels of quality, appropriate bandwidth on the communication link 170 may be available to transmit the multi-format encoded content to the subscriber domain 160-1 without delays such that the user is able to playback the content encoded in the different formats in substantially real-time without delays.

However, as further discussed below, note that transmission of the content X encoded in one or more of the different formats or at one or more different levels of quality can include transmitting one or more formats of the encoded content using adaptive bit rate technology if such transmission is prone to delays caused by congestion. In other words, the content delivery resource 140 can be configured to transmit one or more different formats of content over a variable bit rate data link. In such an instance, the content delivery resource 140 can be configured to transmit one or more different formats of requested content at a variable bit rate if desired.

Figure 3:
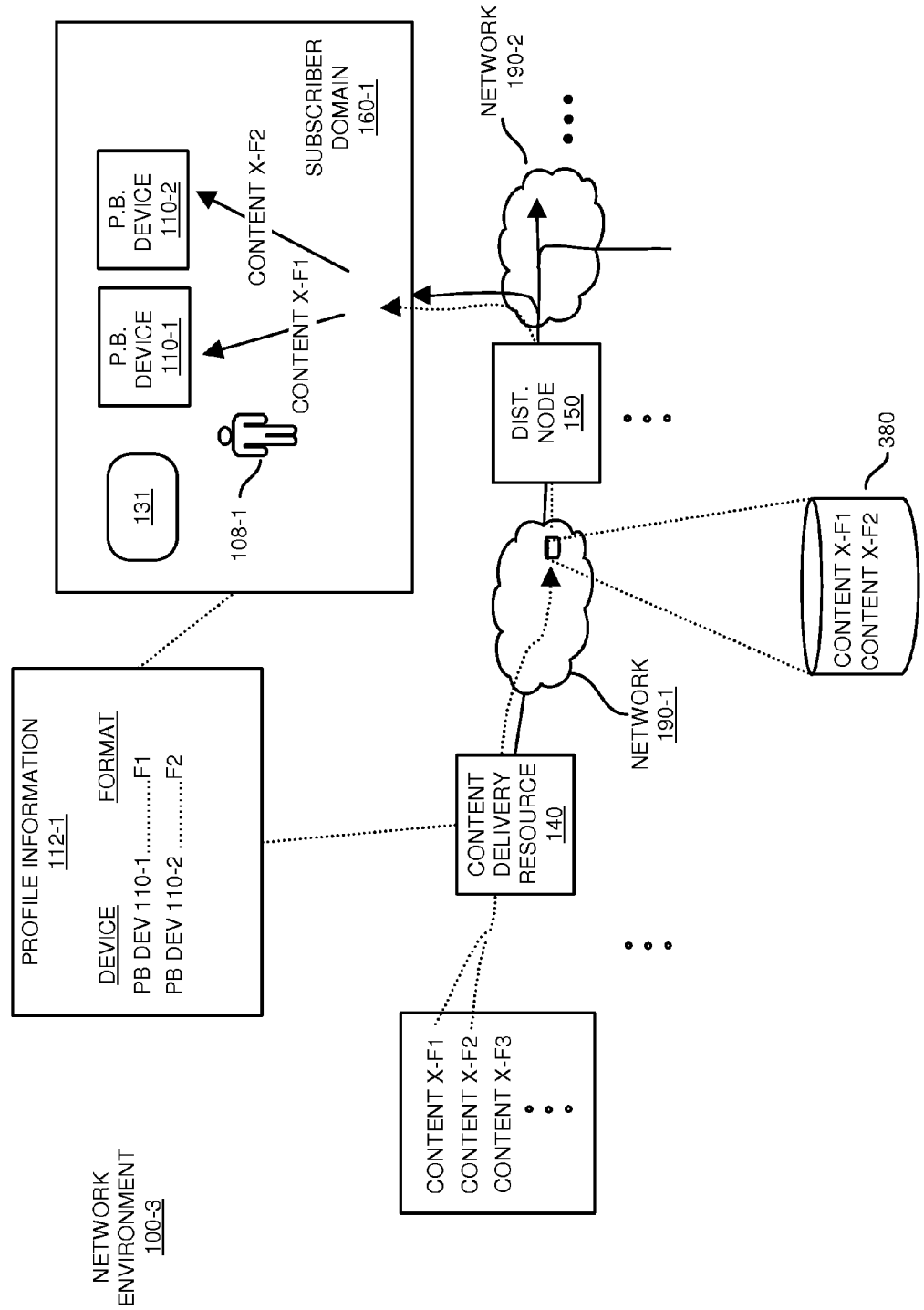
FIG. 3 is an example diagram illustrating storage of multiple formats of requested in a network cloud for later retrieval and consumption by a subscriber according to embodiments herein.

FIG. 3 is an example diagram illustrating storage of multiple formats of requested in a network cloud for later retrieval and consumption by a subscriber according to embodiments herein.

This example embodiment illustrates that the requested content can be stored in resources located in the cloud on behalf of a respective subscriber. The content delivery resource 140 in network environment 100-3 can operate in similar manner as discussed above to deliver multiple formats of requested content. More specifically, a user can request content; the content delivery resource 140 responds to the request by distributing the content in multiple formats to a repository 380 in the cloud (i.e., network 190-1). The repository 380 is accessible by the playback devices 110 in the subscriber domain 160-1.

Figure 4:
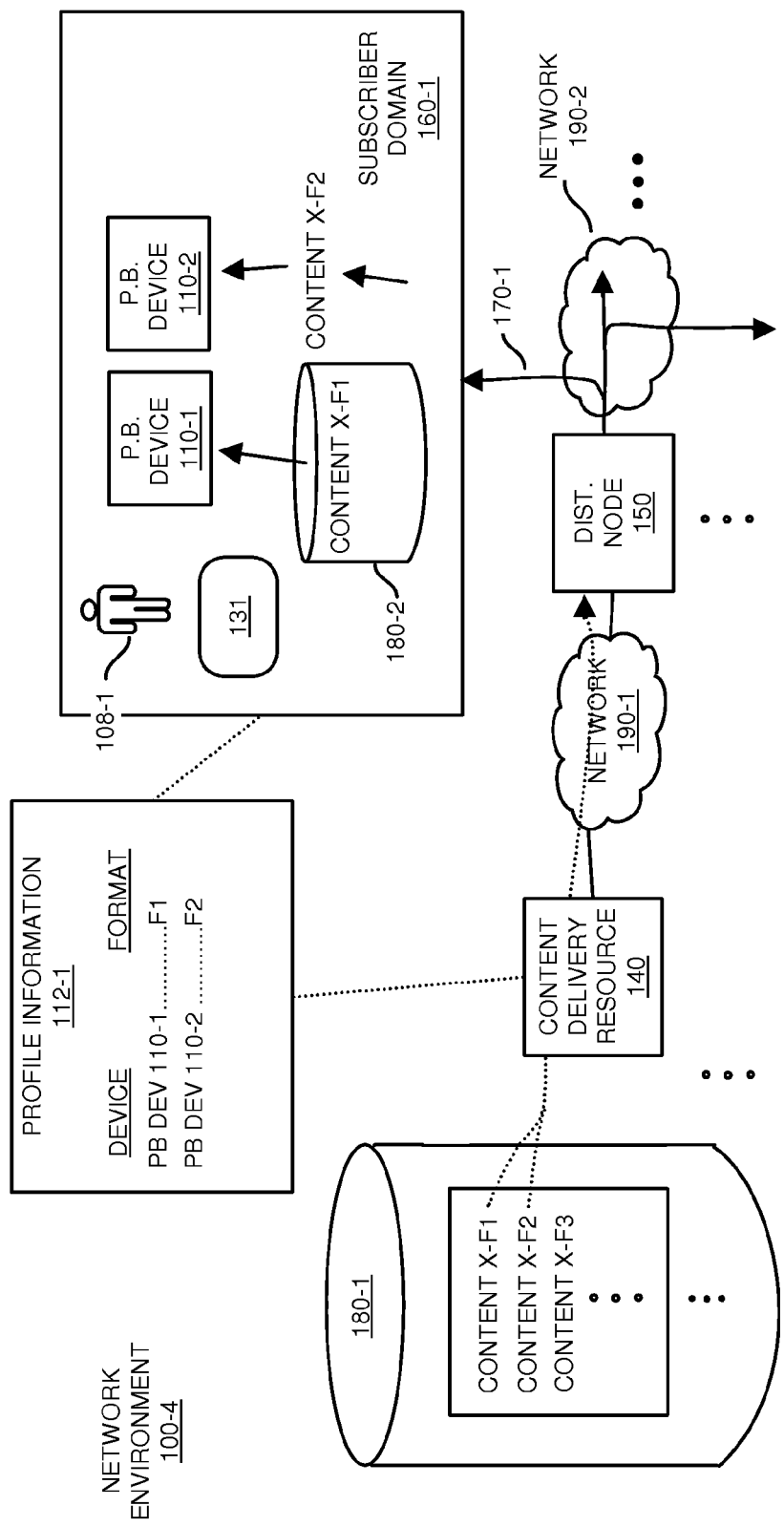
FIG. 4 is an example diagram illustrating distribution of content in multiple different formats according to embodiments herein.

FIG. 4 is an example diagram illustrating distribution of content in multiple different formats according to embodiments herein.

In this example embodiment, the user 108-1 or other suitable resource generates a command for retrieval of specific content such as content X. The content delivery resource 140 in network environment 100-4 initiates delivery of the specified content to the subscriber domain 160-1 in multiple formats F1 and F2 based on the profile information 112-1 in a manner as previously discussed.

However, in contrast to the previous examples, in this example, the content delivery resource 140 can receive information indicating that the playback device 110-2 can directly receive the content X in format F2 for playback or storage. In such an instance, as an alternative to storing both formatted versions of content X (e.g., content X-F1 and content X-F2) in repository 180-2, the content delivery resource 140 can be configured to initiate storage of the content X-F1 in the repository 180-2 and directly transmit the content X-F2 to the playback device 110-2 either for storage or immediate playback.

As a more specific example, assume that the content delivery resource receives a request to transmit specified content to subscriber domain 160-1. In response to the request, the content delivery resource 140 can be configured to stream a first version of the requested content (i.e., content X-F1) over a broadcast type communication channel of the communication link 170-1 to store the specified content in the first format in repository 180-2 for playback by playback device 110-1.

Via communications from a remote resource, the content delivery resource 140 or other suitable resource can detect use of the playback device 110-2 in the subscriber domain 160-1. In response to detecting the use, the content delivery resource 140 can provide a notification such as a message over an IP communication channel to the playback device 110-2 in the subscriber domain 160-2. The notification can indicate to the respective operator of the playback device 110-2 that a version of the specified content (e.g., content X) has been requested for retrieval. Thus, the operator of the playback device 110-2 can be notified of the content request or that requested content currently is (or was) transmitted over a broadcast type channel to the subscriber domain 160-1.

The content delivery resource 140 can further produce a query to the user of the playback device 110-2 asking the user of the playback device 110-2 whether to stream an appropriate version (e.g., content X-F2) of the content directly to the playback device 110-2. If the operator responds in the affirmative, that is, the user 108-1 provides input from the second playback device to the content delivery resource 140 confirming a desire to stream a second formatted version of the specified content (i.e., content X-F2) directly to the second playback device, the content delivery resource 140 initiates transmission of the second formatted version of the specified content over a portion of bandwidth of the shared cable network allocated for transmission of IP (Internet Protocol) data traffic to subscriber domain 160-1. In other words, the content delivery resource 140 transmits the second formatted version (e.g., format F2) of content as IP data traffic.

Thus, embodiments herein can include receiving the request to stream specified content to the subscriber domain 160-1. In response to the request(s), the content delivery resource 140 initiates delivery of the requested content in multiple formats over multiple types of channels including a first channel supporting broadcast type communications and a channel and a second channel supporting IP type communications.

Thus, via direct notification and subsequent transmission of the formatted content to the playback device 110-2, the user operating the playback device 110-2 need not perform the extra step of downloading the content X from repository 180-2.

Figure 5:
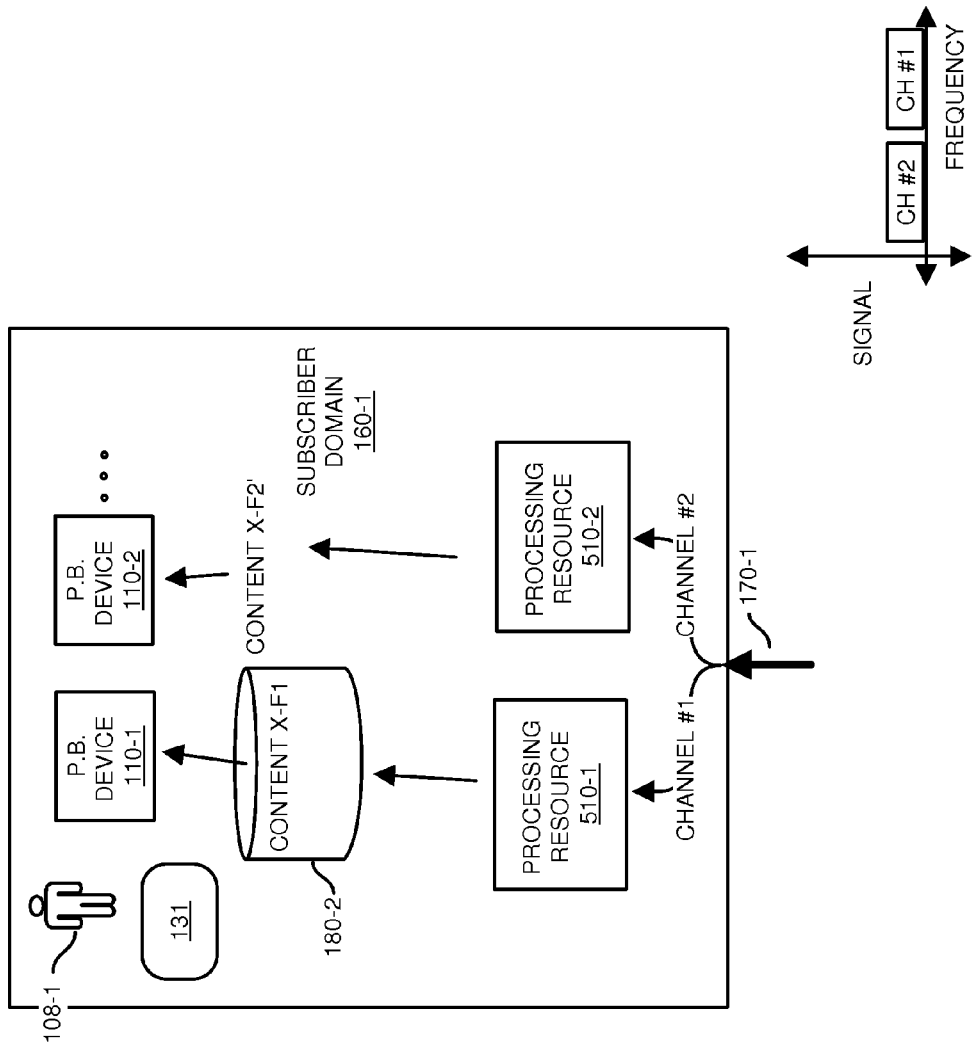
FIG. 5 is an example diagram illustrating use of bandwidth on a communication link to distribute multiple formats of content according to embodiments herein.
Figure 6:
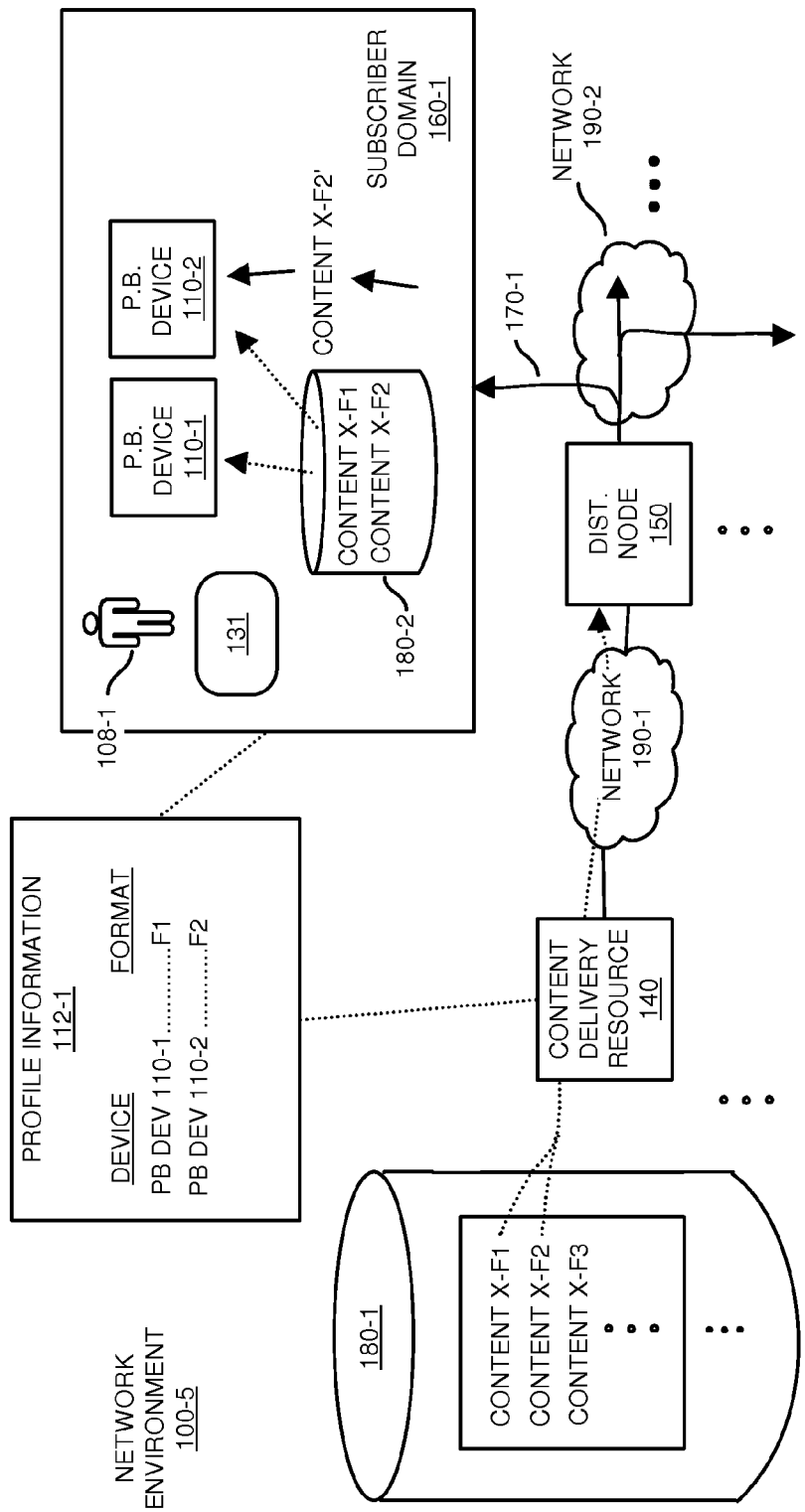
FIG. 6 is another example diagram illustrating distribution of content in multiple different formats according to embodiments herein.

FIG. 5 is a more detailed diagram illustrating the subscriber domain 160-1 in FIG. 6 according to embodiments herein.

As shown, one way to provide direct delivery of different formats of content to devices (e.g., playback device, storage device, etc.) in the subscriber domain 160-1 in network environment is to convey the different formatted content over different communication channels as mentioned above.

For example, responsive to the request for content, the content delivery resource 140 can stream a first version of the specified content in a first encoding format F1 over a first communication channel (e.g., channel #1) of a shared cable network to repository 180-2 (e.g., storage device) associated with the subscriber domain 160-1. As mentioned, the first encoding format supports playback by first playback device 110-1 in the subscriber domain 160-1.

The content delivery resource 140 streams a second version of the specified content in a second encoding format (e.g., format F2) over a second communication channel (e.g., channel #2) of the shared cable network.

In this example embodiment, the first communication channel (on which the content X-F1 is transmitted) is a broadcast type channel having a predetermined amount of bandwidth to deliver the formatted content. That is, the content delivery resource 140 transmits the first version of the specified content over a dedicated portion of bandwidth of a shared cable network supporting broadcast communications. The processing resource 510-1 such as a set-top box device in the subscriber domain 160-1 processes the communication signals received on communication link 170-1. Specifically, the processing resource 510-1 tunes to one or more particular carrier frequencies to retrieve and subsequently store the content X-F1 transmitted on a broadcast channel or QAM channel to the repository 180-2.

Also, in this example embodiment, as mentioned, the second communication channel (on which the content X-F2 is transmitted) can be an IP type channel. In other words, the second communication channel (e.g., channel #2) supports transmission and delivery of data packets transmitted in a packet-switched data network. The content delivery resource 140 transmits the second version of the specified content (e.g., content X-F2) over a dedicated portion of bandwidth of a shared cable network supporting IP communications.

In one embodiment, the communication link 170-1 supports DOCSIS (Data Over Cable Service Interface Specification), an international telecommunications standard that permits the addition of high-speed data transfer to an existing cable TV (CATV) system. DOCSIS is typically employed by cable television operators to provide Internet access over existing hybrid fiber-coaxial (HFC) type infrastructure.

The processing resource 510-2 (e.g., a cable modem, a DOCSIS router, etc.) processes the communication signals received on communication link 170-1. Specifically, the processing resource 510-2 monitors a bandwidth of claim 170-1 supporting IP data packet traffic to receive the content X-F2. Processing resource 510-2 initiates transmission of the content X-F2 to the playback device 110-2.

As mentioned, the first channel CH #1 can be configured to support a predetermined bandwidth. In such an embodiment, the content delivery resource 140 can transmit the first version of the specified content in accordance with a pre-determined bit rate. For example, if the playback device 110-1 supports a highest level of quality as specified by the profile information 112-1, the content delivery resource 140 can transmit the content X-F1 at the highest bit rate such as bit rate BR #1. In alternative embodiments, note that the processing resource 510-1 can initiate a file transfer of the content X-F1 from repository 180-2 to playback device 110-1. The playback device 110-1 stores the content locally and plays back the received content X-F 11 in accordance with input commands from the user 108-1 operating the playback device 110-1.

The second communication channel may be prone to congestion because it is IP data traffic type of channel. In such an instance, the content delivery resource 140 can be configured to transmit the content X-F2 at a variable bit rate if desired. For example, the content delivery resource 140 can attempt to stream the content X-F2 at a highest needed bit rate of bit rate BR4 to the playback device 110-2. However, when congestion occurs, the content delivery resource 140 can adapt the bit rate to lower levels of quality (e.g., bit rate BR5, BR6, etc.) such that the use of the playback device 110-2 can continue to playback the content X without undesirable delays.

Thus, embodiments herein can include transmitting a first version of the specified content as a non-adaptive bit rate data stream (on a predetermined channel bandwidth) and transmitting a second version of the specified content as an adaptive bit rate data stream (on a variable channel bandwidth) to the subscriber domain 160-1.

In accordance with yet a further example use case, the subscriber domain 160-1 can receive a first formatted version of the specified content over a portion of bandwidth of a shared communication link via broadcast type communications. A user in the subscriber domain 160-1, operating the playback device 110-2, can receive a notification indicating that the first formatted version of the specified content was or is being transmitted to the subscriber domain 160-1 based on a previous request of such content. The content delivery resource 140 or other suitable resource can present a query to the user of the playback device 110-2 whether they would like to receive the specified content directly to the playback device 110-2. If so, the user of the playback device 110-2 provides input to the content delivery resource 140 requesting transmission of a second formatted version of the specified content to the subscriber domain 160-1. To service the request, the content delivery resource 140 transmits the second formatted version of the specified content over a portion of bandwidth of communication link 170-1 (such as a shared cable network) allocated for transmission of IP (Internet Protocol) data traffic. Thus, the user 108-1 can be notified of the availability of content and easily view the content on multiple different types of playback devices.

FIG. 6 is an example diagram illustrating distribution of content in multiple different formats according to embodiments herein.

In this example embodiment, the content delivery resource 140 initiates delivery and storage of content X-F1 and content X-F2 in storage device 180-2 in a manner as previously discussed over one or more broadcast type channels. Additionally, the content delivery resource 140 simultaneously transmits a version of the content X in format #2 directly to the playback device 110-2 over an IP data channel. In such an instance, the content delivery resource 140 delivers three streams of data to the subscriber domain 160-1.

By further way of a non-limiting example, the content delivery resource can transmit the two streams of data (e.g., content X-F1 and content X-F2) on one or more broadcast type channels for storage in repository 180-2. Each of these streams of data can be transmitted as non-adaptive bit rate data streams or at a predetermined bit rate since the channels have a predetermined amount of bandwidth to convey such data. The third stream of data (e.g., content X-F2') can be transmitted as an adaptive bit rate data stream over an IP traffic channel in a manner as previously discussed.

Thus, in accordance with one embodiment, a user of playback device 110-2 can receive a notification from the content delivery resource or other suitable resource that one or more versions of the specified content has been or are being stored in a storage device. The user of the playback device 110-2 can provide input to the content delivery resource 140 to directly receive the previously requested content. The input can be a request to playback a version of the specified content on the second playback device 110-2. In response to the request for content on the playback device 110-2, the content delivery resource 140 delivers content X-F2' (e.g., an adaptive bit rate or non-adaptive bit rate data stream) directly to the second playback device as IP data traffic in the third data stream.

Figure 7:
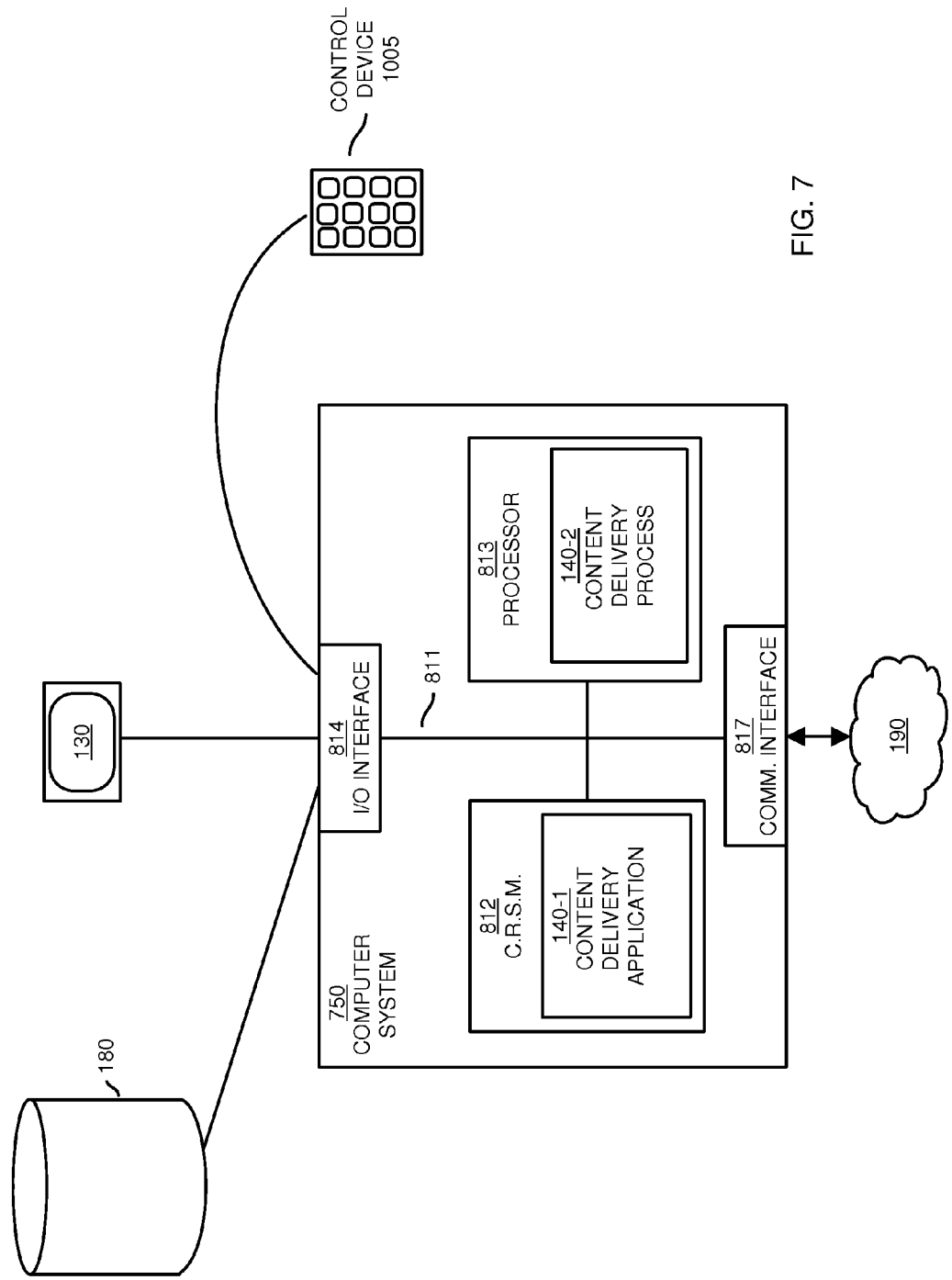
FIG. 7 is a diagram illustrating an example hardware architecture including a processor and an encoded hardware storage medium according to embodiments herein.

FIG. 7 is an example block diagram of a computer system for implementing any of the operations as discussed herein according to embodiments herein.

Computer system 750 can reside in any of the resources as discussed herein such as content delivery resource 140, each of the playback devices 110, etc.

As shown, computer system 750 of the present example can include an interconnect 811 that couples computer readable storage media 812 such as a non-transitory type of media (i.e., any type of hardware storage medium) in which digital information can be stored and retrieved, a processor 813 (e.g., one or more processing devices), I/O interface 814, and a communications interface 817.

I/O interface 814 provides connectivity to other resources such as repository 180.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 750 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with content delivery application 140-1 (e.g., software, firmware, etc.) executed by processor 813. Content delivery application 140-1 can be configured to include instructions to implement any of the operations associated with content delivery resource 140 as discussed herein.

During operation of one embodiment, processor 813 accesses computer readable storage media 812 via the use of interconnect 811 in order to launch, run, execute, interpret or otherwise perform the instructions in content delivery application 140-1 stored on computer readable storage medium 812.

Execution of the content delivery application 140-1 produces processing functionality such as content delivery process 140-2 in processor 813. In other words, the content delivery process 140-2 associated with processor 813 represents one or more aspects of executing content delivery application 140-1 within or upon the processor 813 in the computer system 750.

Those skilled in the art will understand that the computer system 750 can include other processes and/or software and hardware components, such as an operating system that controls allocation and use of hardware resources to execute the content delivery application 140-1.

In accordance with different embodiments, note that computer system may be any of various types of devices, including, but not limited to, a set-top box, a television, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 8-10. Note that the steps in the flowcharts below can be executed in any suitable order.

Figure 8:
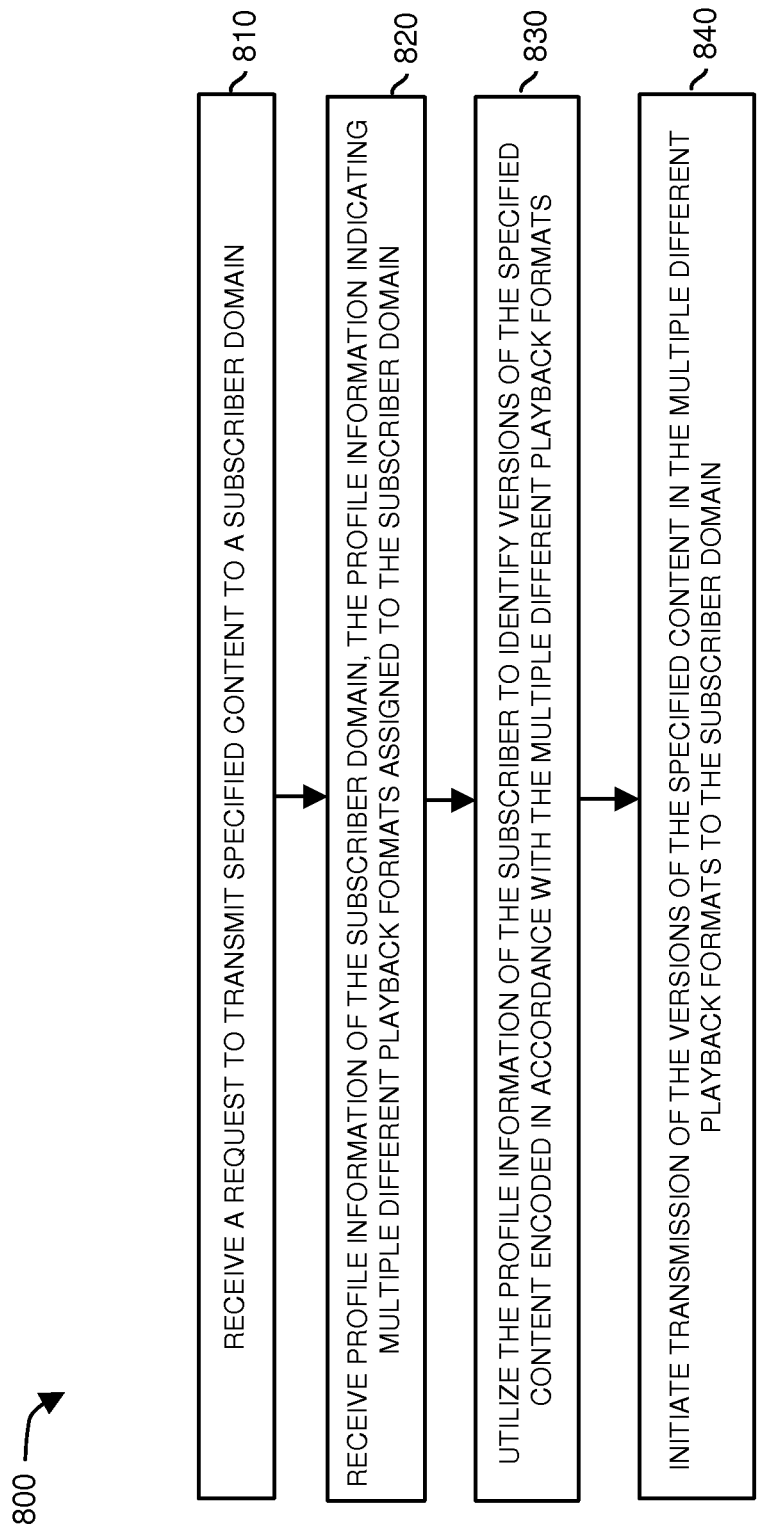
FIGS. 8-10 are flowcharts illustrating example methods according to embodiments herein.

FIG. 8 is a flowchart 800 illustrating an example method of distributing specified content in multiple different formats according to embodiments. Note that there will be some overlap with respect to concepts as discussed above.

In step 810, the content delivery resource 140 receives a request to transmit specified content to a subscriber domain 160-1.

In step 820, the content delivery resource 140 receives profile information 112-1 associated with the subscriber domain 160-1. The profile information 112-1 indicates multiple different playback formats assigned to the subscriber domain 160-1.

In step 830, the content delivery resource 140 utilizes the profile information 112-1 of the subscriber domain 160-1 to identify versions of the specified content encoded in accordance with the multiple different playback formats.

In step 840, the content delivery resource 140 initiates transmission of the versions of the specified content in the multiple different playback formats to the subscriber domain 160-1.

Figure 9:
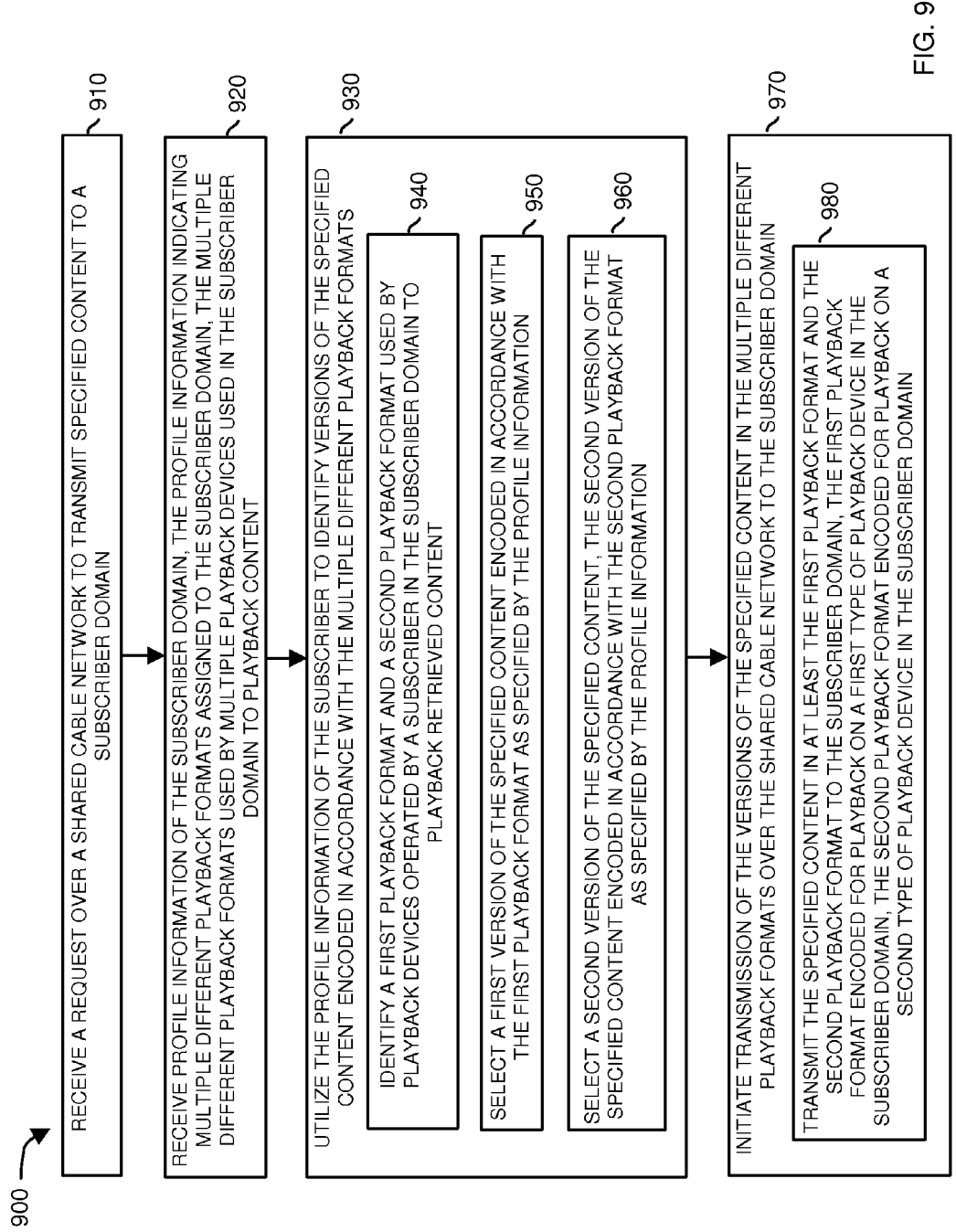

FIG. 9 is a flowchart 900 illustrating an example method of distributing specified content in multiple different formats according to embodiments. Note that there will be some overlap with respect to concepts as discussed above.

In step 910, the content delivery resource 140 receives a request over communication link 170 to transmit specified content to a subscriber domain 160-1.

In step 920, the content delivery resource 140 receives profile information 112-1 of the subscriber domain 160-1. The profile information 112-1 indicates multiple different playback formats assigned to the subscriber domain 160-1. Playback devices 110 use the multiple different playback formats to playback content.

In step 930, the content delivery resource 140 utilizes the profile information 112-1 of the subscriber domain 160-1 to identify versions of the specified content encoded in accordance with the multiple different playback formats.

In sub-step 940, the content delivery resource 140 identifies a first playback format and a second playback format used by playback devices 110 operated in the subscriber domain 160-1 to play back retrieved content.

In sub-step 950, the content delivery resource 140 selects a first version of the specified content encoded in accordance with the first playback format as specified by the profile information 112-1.

In sub-step 960, the content delivery resource 140 selects a second version of the specified content. The second version of the specified content is encoded in accordance with the second playback format as specified by the profile information 112-1.

In step 970, the content delivery resource 140 initiates transmission of the versions of the specified content in the multiple different playback formats over communication link 170-1 to the subscriber domain 160-1.

In sub-step 980, the content delivery resource 140 transmits the specified content in at least the first playback format and the second playback format to the subscriber domain 160-1. In one embodiment, the first playback format is encoded for playback on a first type of playback device 110-1 in the subscriber domain 160-1; the second playback format is encoded for playback on a second type of playback device 110-2 in the subscriber domain 160-1.

Figure 10:
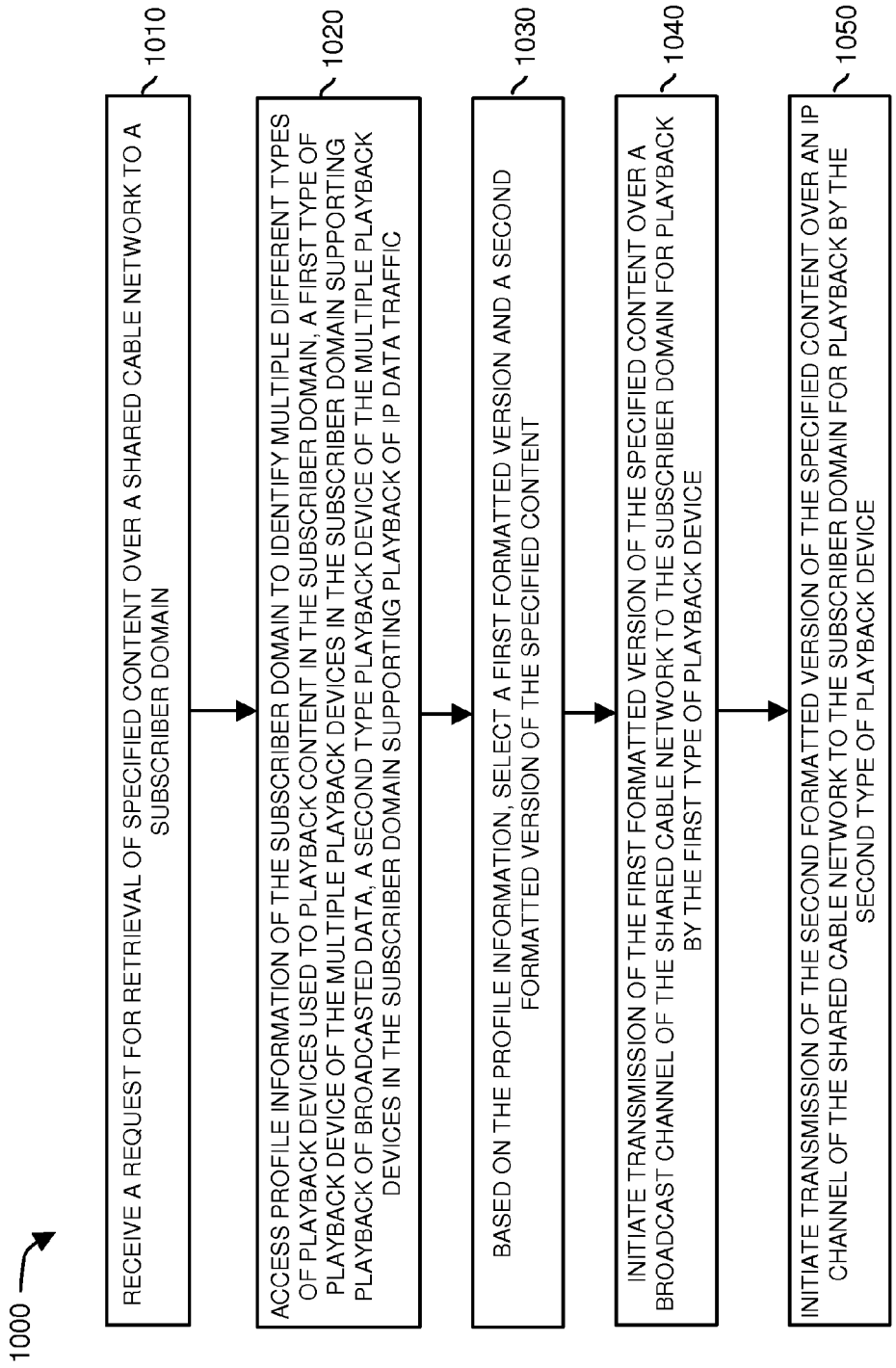

FIG. 10 is a flowchart 1000 illustrating an example method of distributing specified content in multiple different formats according to embodiments. Note that there will be some overlap with respect to concepts as discussed above.

In step 1010, the content delivery resource 140 receives a request for retrieval of specified content over a shared cable network to a subscriber domain 160-1.

In step 1020, the content delivery resource 140 accesses profile information 112-1 of the subscriber domain 160-1 to identify multiple different types of playback devices 110 used to playback content in the subscriber domain 160-1. A first type of playback device 110-1 of the multiple playback devices 110 in the subscriber domain 160-1 supports playback of broadcast data; a second type playback device 110-2 of the multiple playback devices 110 in the subscriber domain 160-1 supports playback of IP data traffic.

In step 1030, based on the profile information 112-1, the content delivery resource 140 selects a first formatted version and a second formatted version of the specified content.

In step 1040, the content delivery resource 140 initiates transmission of the first formatted version of the specified content over a broadcast channel of the shared cable network to the subscriber domain 160-1 for playback by the first type of playback device.

In step 1050, the content delivery resource 140 initiates transmission of the second formatted version of the specified content over an IP channel of the shared cable network to the subscriber domain 160-1 for playback by the second type of playback device.

Note again that techniques herein are well suited for distributing content encoded in different formats in a network environment based on profile information. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
  receiving a request from a user to transmit specified content to a subscriber domain in which the user resides;
  subsequent to receiving the request for the specified content, accessing profile information assigned to the subscriber domain, the profile information indicating multiple different playback formats assigned to the subscriber domain;
  utilizing the profile information assigned to the subscriber domain to identify versions of the specified content encoded in accordance with the multiple different playback formats assigned to the subscriber domain; and
  to satisfy the request from the user, initiating transmission of the versions of the specified content in the multiple different playback formats to the subscriber domain:
  wherein receiving the request includes: receiving the request, from a first playback device operated by the user in the subscriber domain, the request received from the first playback device to transmit the specified content to the first playback device, the profile information indicating that the first playback device supports playback of the specified content in accordance with a first encoding format, the method further comprising:
  utilizing the profile information to identify that a second playback device in the subscriber domain supports a second encoding format, the second encoding format different than the first encoding format; and
  wherein initiating transmission of the versions of the specified content in the multiple different playback formats to the subscriber domain includes: in response to receiving the request from the first playback device: i) transmitting the specified content in the first encoding format to the subscriber domain over a first channel of a shared communication link, the first channel supporting data transmissions over a first carrier frequency, and ii) transmitting the specified content in the second encoding format to the subscriber domain over a second channel of the shared communication link, the second channel supporting data transmissions over a second carrier frequency.

2. The method as in claim 1 further comprising:
receiving the request from the user in the subscriber domain, the profile information indicating the multiple different playback formats of multiple different types of playback devices operated in the subscriber domain.

3. The method as in claim 1, wherein initiating transmission of the versions of the specified content in the multiple different playback formats includes:
in response to the request from the user, transmitting the specified content in at least the first encoding format and the second encoding format to the subscriber domain, the first encoding format encoded for playback on a first type of playback device in the subscriber domain, the second encoding format encoded for playback on a second type of playback device in the subscriber domain, the request from the user being the only request received from the subscriber domain to retrieve the specified content.

4. The method as in claim 1 further comprising:
initiating storage of the versions of the specified content in a storage device disposed in the subscriber domain in which multiple different types of playback devices subsequently access and playback the specified content in the multiple different playback formats.

5. The method as in claim 1 further comprising:
transmitting the specified content in the first encoding format over the first channel in accordance with a non-adaptive bit rate; and
transmitting the specified content in the second encoding format over the second channel as an adaptive bit rate data stream.

6. The method as in claim 1 further comprising:
transmitting the specified content in the first encoding format over a dedicated portion of bandwidth of a shared cable network supporting broadcast communications; and
transmitting the specified content in the second encoding format over a dedicated portion of bandwidth of the shared cable network supporting IP (Internet Protocol) communications.

7. The method as in claim 1 further comprising:
responsive to the request, streaming the specified content in the first encoding format in accordance with a first playback bit rate and streaming the specified content in the second encoding format in accordance with a second playback bit rate, the second playback bit rate different than the first playback bit rate.

8. The method as in claim 1 further comprising:
streaming the specified content in the first encoding format over a broadcast channel of a shared cable network to a repository in the subscriber domain, the first version of the content encoded for playback by the first playback device in the subscriber domain;
providing notification to the second playback device in the subscriber domain that the specified content has been requested for retrieval;
detecting input provided from the second playback device to stream the specified content in the second encoding format directly to the second playback device; and
initiating transmission of the specified content in the second encoding format over a portion of bandwidth of the shared cable network dedicated to transmission of IP (Internet Protocol) data traffic.

9. The method as in claim 1 further comprising:
in response to receiving the request, streaming the specified content in the first encoding format and the second encoding format over the shared communication link to a repository in the subscriber domain, the first version of the specified content and the second version of specified content transmitted over bandwidth of the shared communication link supporting QAM modulation, the specified content in the first encoding format encoded for playback by the first playback device in the subscriber domain, the specified content in the second encoding format encoded for playback by the second playback device in the subscriber domain;
streaming the specified content in a third encoding format over bandwidth of the shared cable network dedicated to convey transmission of IP (Internet Protocol) data traffic to the subscriber domain.

10. The method as in claim 1 further comprising:
prior to initiating transmission of the versions of the specified content to the subscriber domain:
providing a notification to the user that the specified content can be transmitted to the subscriber domain in the multiple playback formats as specified by the profile information; and
as a response to the notification, receiving a reply from the user in the subscriber domain, the reply indicating to transmit the specified content in the multiple playback formats to the subscriber domain.

11. The method as in claim 1 further comprising:
prior to initiating transmission of the specified content in the first encoding format and the second encoding format to the subscriber domain:
providing a notification to the user that the specified content can be transmitted in the second encoding format for playback by the second playback device; and
receiving a reply from the user to also transmit the specified content in the second encoding format to the subscriber domain.

12. A method comprising:
receiving a request for retrieval of specified content over a broadcast channel of a shared cable network to a subscriber domain;
subsequent to receiving the request, accessing profile information of the subscriber domain to identify multiple different types of playback devices used to playback content in the subscriber domain, at least one of the playback devices supporting playback of IP data traffic;
providing notification that the specified content has been requested for retrieval; and
initiating transmission of the specified content over an IP (Internet Protocol) channel of the shared cable network supporting IP data traffic;
wherein receiving the request includes: receiving the request from a first playback device operated by a user in the subscriber domain, the request received from the first playback device to transmit the specified content to the first playback device, the profile information indicating that the first playback device supports playback of the specified content in accordance with a first encoding format, the method further comprising:
utilizing the profile information to identify that a second playback device in the subscriber domain supports a second encoding format, the second encoding format different than the first encoding format; and wherein initiating transmission of specified content includes: in response to receiving the request from the first playback device: i) transmitting the specified content in the first encoding format to the subscriber domain over the broadcast channel of the shared cable network, the broadcast channel supporting data transmissions over a first carrier frequency, and ii) transmitting the specified content in a second encoding format to the subscriber domain over the IP channel of the shared cable network, the IP channel supporting data transmissions over a second carrier frequency.

13. A computer system comprising:
   at least one processor device; and
   a hardware storage resource coupled to the at least one processor device, the hardware storage resource storing instructions that, when executed by the at least one processor device, cause the at least one processor device to perform the operations of:
   receiving a request from a user to transmit specified content to a subscriber domain;
   receiving profile information assigned to the subscriber domain, the profile information indicating multiple different playback formats assigned to the subscriber domain;
   utilizing the profile information of the subscriber domain to identify versions of the specified content encoded in accordance with the multiple different playback formats assigned to the subscriber domain; and
   in response to receiving the request from the user, initiating transmission of the versions of the specified content in the multiple different playback formats to the subscriber domain;
   wherein receiving the request includes: receiving the request from a first playback device operated by the user in the subscriber domain, the request received from the first playback device to transmit the specified content to the first playback device, the profile information indicating that the fist playback device supports playback of the specified content in accordance with a first encoding format, the method further comprising:
   utilizing the profile information to identify that a second playback device in the subscriber domain supports a second encoding format, the second encoding format different than the first encoding format; and
   wherein initiating transmission of the versions of the specified content in the multiple different payback formats to the subscriber domain includes: in response to receiving the request from the first playback device: i) transmitting the specified content to the subscriber domain in the first encoding format, and ii) transmitting the specified content to the subscriber domain in the second encoding format;
   the method further comprising: prior to initiating transmission of the specified content in the first encoding format and the second encoding format to the subscriber domain:
      providing a notification to the user that the specified content can be transmitted in the second encoding format for playback by the second playback device:
      receiving a reply from the user as a response to the notification, the reply indicating to also transmit the specified content in the second encoding format to the subscriber domain: and
   transmitting the specified content in both the first encoding format and the second encoding format to the subscriber domain.

14. The computer system as in claim 13, wherein the at least one processor device further supports operations of:
   receiving the request over a shared cable network from the user; and
   initiating transmission of the versions of the specified content in the multiple different playback formats over the shared cable network to the subscriber domain.

15. The computer system as in claim 14, wherein the at least one processor device further supports operations of:
   receiving the request from the user in the subscriber domain, the profile information indicating the multiple different playback formats of multiple different types of playback devices operated in the subscriber domain.

16. The computer system as in claim 14, wherein the at least one processor device further supports operations of:
   initiating storage of the versions of the specified content in a storage device disposed in the subscriber domain in which multiple different types of playback devices subsequently access and playback the specified content in the multiple different playback formats.

17. The computer system as in claim 13, wherein initiating transmission of the versions of the specified content in the multiple different playback formats includes:
   in response to the request from the user, transmitting the specified content in at least the first encoding format and the second encoding format to the subscriber domain, the first encoding format encoded for playback on a first type of playback device in the subscriber domain, the second encoding format encoded for playback on a second type of playback device in the subscriber domain.

18. The computer system as in claim 13, wherein the at least one processor device further supports operations of:
   transmitting the specified content in the first encoding format over a first communication channel in accordance with a non-adaptive bit rate; and
   transmitting the specified content in the second encoding format over a second communication channel as an adaptive bit rate data stream.

19. The computer system as in claim 13, wherein the at least one processor device further supports operations of:
   transmitting the specified content in the first encoding format over a dedicated portion of bandwidth of a shared cable network supporting broadcast communications; and
   transmitting the specified content in the second encoding format over a dedicated portion of bandwidth of the shared cable network supporting IP (Internet Protocol) communications.

20. The computer system as in claim 13 further comprising:
   responsive to the request, streaming the specified content in the first encoding format in accordance with a first playback bit rate and streaming the specified content in the second encoding format in accordance with a second playback bit rate, the second playback bit rate different than the first playback bit rate.

21. The computer system as in claim 13, wherein the at least one processor device further supports operations of:
   in response to receiving the request, streaming the specified content in the first encoding format and the second encoding format over a shared communication link to a repository in the subscriber domain, the first version of the specified content and the second version of the specified content transmitted over bandwidth of the shared communication link supporting QAM modulation, the specified content in the first encoding format encoded for playback by the first playback device in the subscriber domain, the specified content in the second encoding format encoded for playback by the second playback device in the subscriber domain;

streaming the specified content in a third encoding format over bandwidth of the shared cable network dedicated to convey transmission of IP (Internet Protocol) data traffic to the subscriber domain.

* * * * *